H. Martin,
Making Staves.
No. 78,882. Patented June 16, 1868.
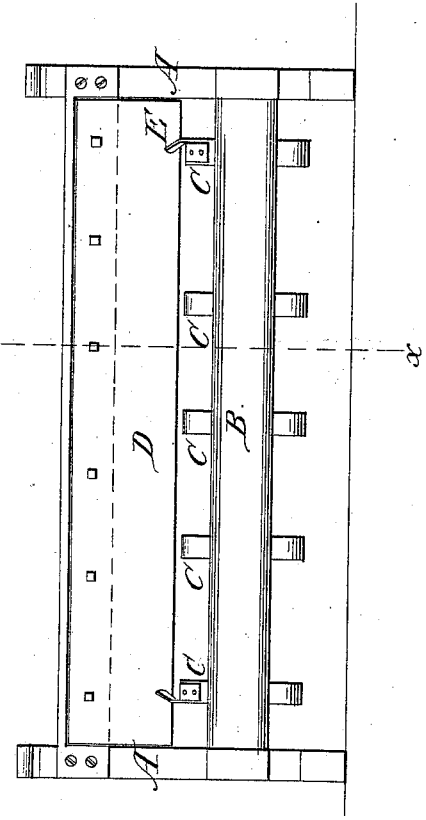
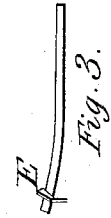
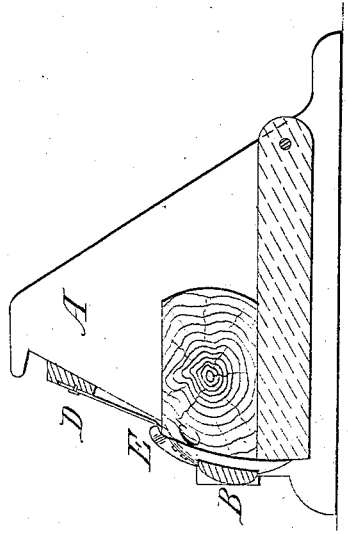
Witnesses:
J. W. Wister
Inventor.
Henry Martin
per
J. H. Alexander
Atty.

United States Patent Office.

HENRY MARTIN, OF GALVESTON, INDIANA.

Letters Patent No. 78,882, dated June 16, 1868.

IMPROVEMENT IN MACHINES FOR CUTTING STAVES.

*The Schedule referred to in these Letters Patent and making part of the same.*

TO ALL WHOM IT MAY CONCERN:

Be it known that I, HENRY MARTIN, of Galveston, in the county of Cass, and State of Indiana, have invented a new and useful Improvement in Stave-Cutting Machines; and I do hereby declare that the following is a full, clear, and exact description thereof, which will enable others skilled in the art to make and use the same, reference being had to the accompanying drawings forming part of this specification.

This invention consists in the application of two knives or cutters to a stave-cutting machine, arranged in such a manner as to bevel or chamfer the ends of the staves simultaneously with the cutting of them from the block or bolt, and making the staves all equal in length.

In the accompanying drawings—

Figure 1 is a side sectional view of a stave-cutting machine having my improvement applied to it, and taken in the line $x\,x$, fig. 2.

Figure 2, a front view of the same.

Figure 3, a plan or top view of one of the cutters.

Similar letters of reference indicate like parts.

A A represent two upright side pieces, to the front edges of which a horizontal bar, B, is attached, said bar having fingers, C, secured to it at equal distances apart.

The inner surfaces of these fingers are of curved form, as shown clearly in fig. 1, and their upper edges are a trifle below the lower and cutting-edge of a knife, D, secured horizontally to the front edges of the side-pieces A A.

To the two end-pieces $c$, cutters E E are attached, one to each. These cutters are secured to the upper parts of said fingers, and extend above their upper ends, having an inclination inward and obliquely over the top edge of the stave, so that while the stave is being cut from the bolt, the former will have its ends bevelled or chamfered off. This will be fully understood by referring to fig. 3.

The bolt or block from which the staves are cut is placed upon an oscillating-bed, working in an upward and downward direction. The bolt and bed are shown in red in fig. 1.

It will, of course, be understood that the staves, in being bevelled or chamfered, as described, will all be cut of an equal or uniform length.

I do not claim the stave-machine, for that is an old and well-known device; but

I claim as new, and desire to secure by Letters Patent—

The cutters E E, constructed as described, attached to the fingers C of the stave-machine, extending above their upper ends, and having an inclination inward and obliquely over the top edge of the stave, thereby bevelling or chamfering its ends, as herein shown and described.

HENRY MARTIN.

Witnesses:
ISABELLA KIRKPATRICK,
ANN KIRKPATRICK.